United States Patent [19]

Pfeifer

[11] Patent Number: 4,464,822

[45] Date of Patent: Aug. 14, 1984

[54] METHOD OF ASSEMBLING VIBRATION-DAMPING, TORSIONALLY ELASTIC CONNECTORS

[75] Inventor: Peter Pfeifer, Salzburg, Austria

[73] Assignee: Dr. Ing. Geislinger & Co., Schwingungstechnik Gesellschaft mbH., Salzburg, Austria

[21] Appl. No.: 426,697

[22] Filed: Sep. 29, 1982

[30] Foreign Application Priority Data

Oct. 12, 1981 [AT] Austria .................................. 4365/81

[51] Int. Cl.³ ............................................. B23P 11/00
[52] U.S. Cl. ....................................... 29/436; 29/446; 74/574; 267/57; 267/154
[58] Field of Search ............... 29/436, 446, 597; 267/57, 154; 74/574; 269/48.1; 279/4

[56] References Cited

U.S. PATENT DOCUMENTS

| | | | |
|---|---|---|---|
| 2,479,405 | 8/1949 | Ramsey | 279/1 ME |
| 3,032,288 | 5/1962 | Tidland | 242/72 B |
| 3,058,371 | 10/1962 | Haushalter | 74/574 |
| 3,334,886 | 8/1967 | Caunt | 74/574 X |
| 3,577,802 | 5/1971 | Rumsey | 74/574 |
| 3,608,161 | 9/1971 | Kost et al. | 279/4 X |
| 3,792,869 | 2/1974 | Braun | 279/4 |
| 4,144,630 | 3/1979 | Troyer | 29/436 |
| 4,177,914 | 12/1979 | Calvin | 269/48.1 X |
| 4,337,932 | 7/1982 | Dennis et al. | 269/48.1 X |

Primary Examiner—Charlie T. Moon
Assistant Examiner—Ronald S. Wallace
Attorney, Agent, or Firm—Kurt Kelman

[57] ABSTRACT

In torsional vibration dampers and torsionally elastic coupling which comprise torque-transmitting spring elements, which are clamped between spacers by an external clamping ring, which is elastically expanded for the installation of the spacers and spring elements. For a quick and efficient assembling of the dampers or couplings, the spacers alone are initially inserted into the clamping ring and are then subjected to radially outwardly directed pressure until the clamping ring has been expanded beyond the extent required to clamp the spring elements, which are subsequently inserted between the spacers, whereafter the spacers are relieved from pressure. This method can be carried out with the aid of a cylindrical assembling head, which is provided at its periphery with at least one radially movable pressure-applying member, which cooperates with at least one hydraulic cushion, which is adapted to be pressurized.

1 Claim, 4 Drawing Figures

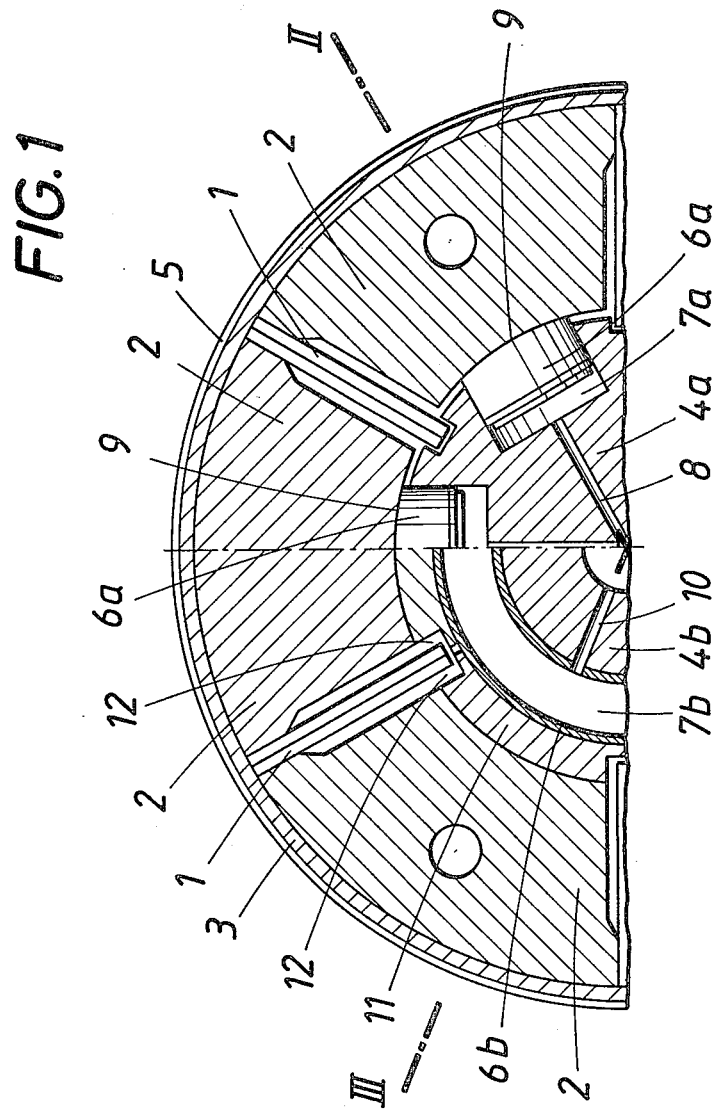

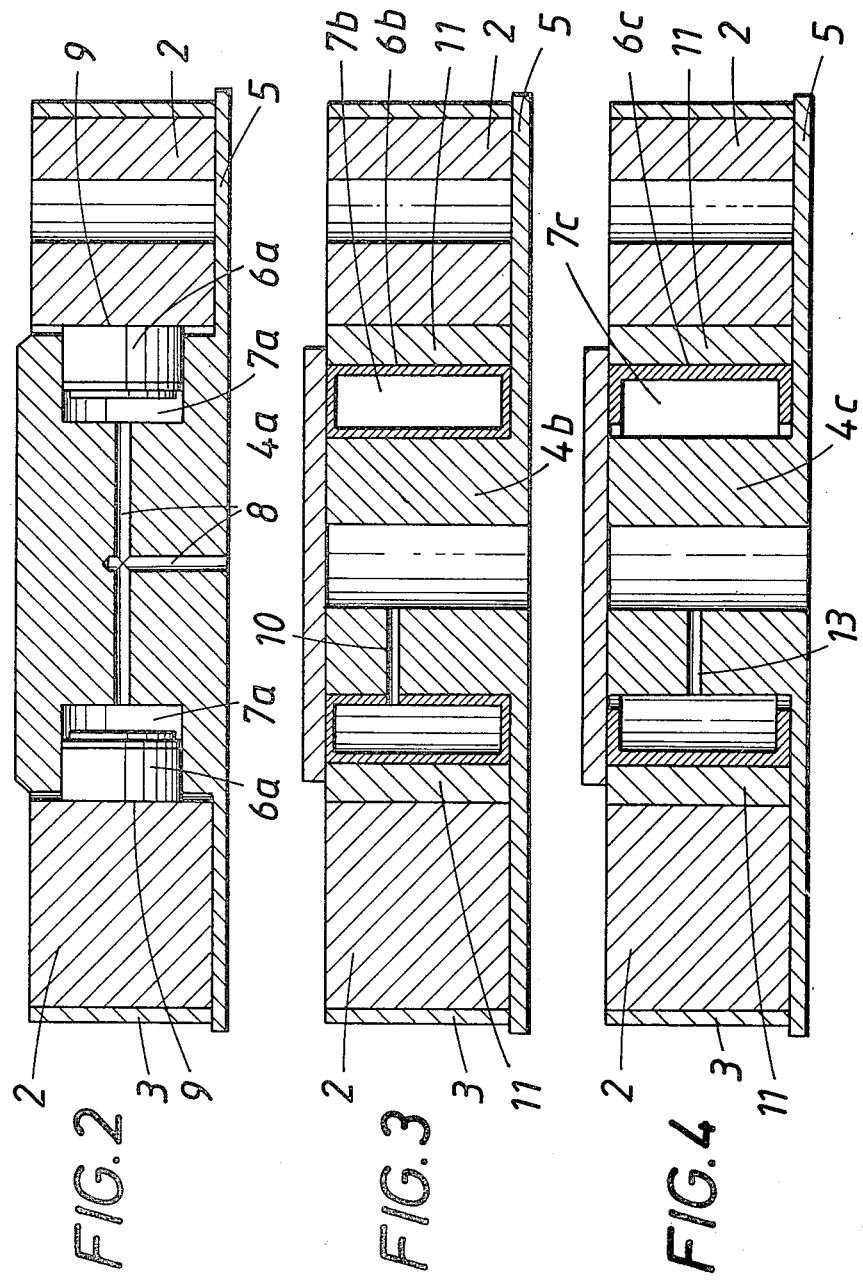

METHOD OF ASSEMBLING VIBRATION-DAMPING, TORSIONALLY ELASTIC CONNECTORS

This invention relates to a method of assembling vibration-damping, torsionally elastic connectors comprising torque-transmitting radial spring elements, which are clamped between spacers by an external clamping ring, which is elastically expanded to receive the spring elements, and apparatus for carrying out that method.

Said vibration-damping, torsionally elastic connectors, such as torsional vibration dampers or torsionally elastic couplings, are known in various types and have proved most satisfactory. Their essential part of said connectors is the insert structure, which substantially consists of radial spring elements, such as leaf springs, spring sets or the like, spacers which between their outer ends receive said spring elements, and a clamping ring, which holds the spacers and spring elements together. To exert the force required to clamp the spring elements, the clamping ring must be subjected to a corresponding tangential stress. The greatest difficulties are involved in the assembling of said insert structure whereas no problem is involved in the subsequent completion of the damper or coupling because it is sufficient to slidably fit the insert structure onto the inner member of the damper or coupling, which inner member is formed with grooves for receiving the free ends of the spring elements, and to secure the insert structure to the outer member of the damper or coupling by screw bolts extending through a cover and the spacers. For an assembling of the insert structure in such a manner that the desired tangential stress is set up in the clamping ring, it is the previous practice to provide an auxiliary ring, which is associated with the clamping ring, which in the unassembled state has an inside diameter which is smaller than the outside diameter of the auxiliary ring. The contacting surfaces of the auxiliary ring and clamping ring are conical. As the clamping ring is forced by a suitable press onto the auxiliary ring, which surrounds the spacers and spring elements, during the assembling, the clamping ring is expanded so that the desired tangential stress is set up. But that known assembling method requires the use of an auxiliary ring, which is required only for the assembling and is superflous otherwise, and the use of that auxiliary ring and of a conical clamping ring requires space, which is at a premium. Besides, the press required in that method has two press platens having dimensions corresponding to the insert structure and must be capable of applying a substantial pressing force of, e.g., 500 tons and more. Owing to the large size of that press it is necessary in most cases to assemble the couplings or dampers and particularly their insert structures in the plant of the manufacturer so that it is not possible to carry out that assembling as well as repairs in the field, for instance in ships or diesel generating stations.

Whereas theoretically the insert structure might be assembled also in that the clamping ring is thermally expanded, that assembling method cannot be adopted in practice because it would require high temperatures and expensive equipment.

It is an object of the invention to eliminate these disadvantages and to provide a method which is of the kind described first hereinbefore and permits a quick and efficient assembling of the dampers or couplings at any desired location and without a need to use presses or separate auxiliary elements which occupy part of the space that is available. Besides, a handy apparatus is to be provided, which is relatively small in size and can be used to carry out that method.

The method by which said method is accomplished is characterized according to the invention in that the spacers alone are inserted into the clamping ring before the latter is expanded, the spacers are then subjected to radially outwardly directed pressure until the clamping ring has been expanded beyond the extent which is required to set up the tangential stress required to clamp the spring elements, the spring elements are then inserted between the spacers and spacers are subsequently relieved from the radial pressure. In an ingenious manner the invention utilizes the recognition that the tangential stress of the clamping ring must amount during operation only to a fraction, for instance, one-third, of the yield point of the material of the clamping ring in view of the stresses which occur in addition to the force for clamping the spring elements, and are due to centrifugal force and oil pressure, and owing to the margin of safety which is required in any case, and that said operating stress can be substantially exceeded and can amount to as much as two-thirds of the yield point during the assembling. Because the tangential stress can be increased, the clamping ring can be expanded beyond its normal size when it is desired to assemble the insert structure so that both the spacers and the spring elements can easily be accommodated within the expanded clamping ring and can even by inserted by hand. There is no need to provide special auxiliary elements for the assembling of the insert structure and the clamping ring need not be conical so that the space available is optimally utilized and the design can be simplified and will be less expensive. To permit an expansion of the clamping ring without a need for a large structural expenditure, the forces by which the clamping ring is expanded are not applied directly to the clamping ring but to the spacers which have been inserted before the clamping ring is expanded and which under the action of a corresponding radially outwardly directed pressure transmit said pressure forces at the outside surfaces of the spacers to the clamping ring so that the latter is expanded to the desired oversize. Said oversize expansion of the clamping ring results in larger spacers between the spacers so that the spring elements can be conveniently inserted at their proper positions between the spacers. When the spacers are relieved from the radial pressure forces, the clamping ring will contract to the extent which is permitted by the spring elements and spacers and will clamp the same with the required force so that the insert is then completed. The clamping force which has been achieved can be measured in a simple manner by a measurement of the tangential stress of the clamping ring and that tangential stress can be ascertained by a measurement of the changes of the girth of the clamping ring as all these expansion phenomena are effected in the elastic range so that the tangential stress is proportional to the change of the girth, in accordance with Hooke's law. If such a check indicates that the desired clamping force has not been achieved, the clamping ring can easily be re-expanded so that shims between springs and spacers can be added or removed so that the required clamping forces will be obtained.

According to a development of the invention that method can be carried out in a particularly desirable manner with an apparatus which comprises a substantially cylindrical assembling head, which is preferably carried by a baseplate and is provided at its periphery with at least one radially movable pressure-applying member, which cooperates with at least one hydraulic cushion, which is adapted to be pressurized. That assembling head fits centrally between the spacers which have been inserted into the clamping ring and by means of its pressure-applying member or members can easily impart a radially outwardly directed movement to the spacers. The method according to the invention can be carried out with a small apparatus, which can easily be transported and can be used everywhere. The insert structure of couplings and dampers can be assembled with a few manual operations without a need for additional means because it is sufficient to place the clamping ring on the baseplate around the assembling head and to insert the spacers in the proper position. Pressure applied to the hydraulic cushion or cushions will then cause the pressure-applying member or members of the assembling head to be extended outwardly so that the spacers will be forced outwardly and will expand the clamping ring to the required oversize. The spring elements can then simply be inserted into the gaps between the spacers. Thereafter the hydraulic cushion or cushions is or are relieved so that the insert structure has been completed because the contracting clamping ring will ensure that the insert structure will be held together.

The pressure-applying member or members of the assembling head may engage the spacers at any desired point provided that the spacers are uniformly loaded in a radially outward direction by the pressure-applying member or members. For instance, the pressure-applying members may be engaged with suitable one-way coupling elements which have been inserted into the bores provided in the spacers and intended to receive the fixing screws. It will be desirable and space will be saved, however, if the pressure-applying members engage the inside surfaces of the spacers. For this purpose the pressure-applying members may consist according to the invention of radial pistons, which are guided in cylinders, which accommodate respective hydraulic cushions, and said radial pistons may be equal in number and distribution to the spacers of the connectors which are to be assembled. This results in a suitable and functionally reliable design, in which each of the radial pistons has preferably a cylindrical pressure-applying surface, which conforms to the inside surface of the spacer. The cylinders are supplied with a hydraulic fluid through a central supply conduit and suitable radial passages and can apply the required, uniform pressure to the radial pistons when suppled with pressure fluid from a common source.

Because a separate radial piston must be associated with each spacer, assembling heads comprising such radial pistons are used in most cases to assemble relatively large couplings or dampers or of couplings or dampers which have only a few spacers. Various types of couplings or dampers, particularly smaller couplings or dampers or couplings or dampers having a relatively large number of spacers can be assembled with apparatus in which according to a further feature of the invention the pressure-applying member consists of an annular piston, which surrounds the assembling head and defines with a latter an annular space, which accommodates the hydraulic cushion, or in which the pressure-applying member consists of a rubber bellows, which surrounds the assembling head and in its interior contains the hydraulic cushion. The annular piston and the rubber bellows can be used for a radial load which is uniform around the periphery so that the number of spacers will not be significant in that case. Besides, the hydraulic cushion can be built up by means of a supply conduit, which leads into the annular space or the rubber bellows so that the assembling head can be simplified and is virtually independent of the dimensions involved.

It will also be desirable to provide filling elements, which are interposed between the pressure-applying member or members and the spacers. Because in the insert structure the free inner ends of the spring elements protrude beyond the inner surfaces of the spacers, space for receiving the spring elements must be left free when the pressure-applying member or members is or are engaged with the spacers. This will be necessarily ensured when spaced apart radial pistons are employed but must be ensured by special measures when a peripherally continuous, annular pressure member is used. In order to provide also in that case a design which can be varied as desired and adapted to the insert structure to be assembled in a given case, said filling blocks are provided, which are arranged in an annular series around the annular pressure-applying member and keep free between them the space required for the inner ends of the spring elements but ensure that force will be transmitted in a radial direction between the pressure-applying member and the spacers. Such filling blocks may also be used to increase in a single manner the radial range of action of various assembling heads.

The subject matter of the invention is shown by way of example on the drawings, in which FIG. 1 consists of two transverse sectional views showing one-half each of respective illustrative embodiments of apparatus according to the invention, FIGS. 2 and 3 are axial sectional views showing the embodiments illustrated in the right-hand and left-hand halves of FIG. 1, and FIG. 4 is an axial sectional view showing another illustrative embodiment of apparatus according to the invention.

Couplings or dampers which comprise radial spring elements for transmitting torque comprise an insert structure, which comprises said spring elements and clamps the same as required. For this purpose said spring element 1 are clamped between spacers 2 by a suitable force by an external clamping ring 3. To permit an efficient assembling of said insert structure at any desired location, a cylindrical assembling head 4a, 4b, 4c is provided, which is carried by a baseplate 5 and has an outside diameter which is smaller than the inside diameter of the insert structure to be assembled. That assembling head 4a, 4b, 4c is provided at its periphery with at least one radially movable pressure-applying member 6a, 6b, 6c, which can be forced outwardly as a result of an application of pressure to at least one hydraulic cushion 7a, 7b, 7c, which cooperates with the at least one pressure-applying member. As a result, the spacers 2 are also forced radially outwardly. For the assembling of the insert structure, the clamping ring 3 is placed on the baseplate 5 in a central position relative to the assembling head 4a, 4b, 4c and the spacers 2 are placed in loose condition but in the required order between the clamping ring 3 and the assembling ring 4a, 4b, 4c. As a result of an application of pressure to the pressure-applying member or members 6a, 6b, 6c, the spacers 2 are uniformly forced outwardly to expand the clamping ring 3 to such an extent that the gaps between the spacers 2 are so large that the spring leaves 1 can be conveniently inserted. Thereafter the clamping ring 3 can be relieved from the pressure applied by the spacers 2 so that the clamping ring 3 contracts to clamp the spring elements 1 between the spacers 2 with a desired force. When the insert structure has thus been completed it can be removed from the baseplate 5 and from the assembling head 4a, 4b, 4c.

Owing to its small size and the simple hydraulic system, the apparatus according to the invention can be made at relatively low cost and can easily be handled and can be transported without difficulty and used at any desired location. Because the assembling head is used simply for applying radial pressure to the spacers during the assembling of the insert structure, the pressure-applying members and the hydraulic cushions of the assembling heads 4a, 4b, 4c may be designed in various ways. For instance, in the illustrative embodiment shown in the right-hand half of FIG. 1 and in FIG. 2 the pressure-applying members may consist of radial pistons 6a fitted in cylinders 7a of the assembling head 4a. These cylinders 7a accommodate the hydraulic cushions, which cooperate with the radial pistons 6a and are connected by bores 8 of the assembling head 4a to a pressure fluid source, which is not shown in detail. The radial pistons 6 are equal in number and distribution to the spacers 2 of the insert structure which is to be assembled and to ensure a virtual surface contact with the spacers 2 have a cylindrical end face 9 which conforms to the inside surface of the spacers.

In the illustrative embodiment shown in the left-hand half of FIG. 1 and in FIG. 3 the pressure-applying member consists of a rubber bellows 6b, the interior 7b of which accommodates a hydraulic cushion. When pressure is applied to the rubber bellows 6b via a supply passage 10 in the assembling head 4b, the rubber bellows 6b is uniformly expanded throughout its periphery and regardless of the number and distribution of the spacers applies a uniform pressure to said spacers. In this embodiment, space for the inwardly protruding spring elements 1 is provided by means of filling blocks 11, which are inserted between the rubber bellows 6b and the spacers 2 and ensure the required transmission of force from the rubber bellows 6b to the spacers but have recessed edge portions 12 for receiving the spring elements 1.

As is indicated in FIG. 4, the pressure-applying member may consist of an annular piston 6c, which together with the assembling head 4c defines an annular space 7c, which accommodates the required hydraulic cushion. If pressure is applied to said annular space 7a via the supply passage 13 of the assembling head 4c, the annular piston 6c like the rubber bellows 6b is radially expanded to all sides and applies the desired uniform radial load to spacers 2 provided in any desired number. In that case too, filling blocks 11 provided around the outside periphery of the annular piston 6c serve to transmit pressure between the annular piston 6c and the spacers 2 and define spaces for receiving the spring elements.

The apparatus according to the invention and the method of assembling torsionally elastic couplings and torsional vibration dampers which can be carried out with said apparatus do not require expensive presses or other means, can be used at any desired location and permit the dampers and couplings to be assembled at the location where they are to be used. They eliminate the need for special auxiliary parts and specific designs of components of the damper or coupling and thus permit an optimum utilization of the space available and a considerable cost reduction and increase of the efficiency of the manufacture of such dampers and couplings.

What is claimed is:

1. In a method of assembling a vibration-damping, torsionally elastic connector comprising peripherally spaced apart, radially extending spring elements, spacers disposed between peripherally adjacent spring elements and a clamping ring surrounding said spring elements and spacers and clamping said spring elements between said spacers, wherein the method comprises the step of elastically expanding said clamping ring to receive said spring elements and to set up in said clamping ring a tangential stress which is sufficient to clamp said spring elements between said spacers, the improvement consisting of placing said spacers in said clamping ring when the latter is not expanded, applying radially outwardly directed pressure to said spacers placed in said clamping ring to expand the latter to such an extent that the tangential stress in said clamping ring is higher than is required to clamp said spring elements between said spacers, subsequently inserting said spring elements between said spacers when said radially outwardly directed pressure is being applied to said spacers, and subsequently relieving said radially outwardly directed pressure from said spacers.

* * * * *